United States Patent
Tarkkala

(10) Patent No.: US 8,201,240 B2
(45) Date of Patent: Jun. 12, 2012

(54) SIMPLE SCALABLE AND CONFIGURABLE SECURE BOOT FOR TRUSTED MOBILE PHONES

(75) Inventor: Lauri Tarkkala, Espoo (FI)

(73) Assignee: Nokia Corporation, Espoo (FI)

( * ) Notice: Subject to any disclaimer, the term of this patent is extended or adjusted under 35 U.S.C. 154(b) by 815 days.

(21) Appl. No.: 11/470,307

(22) Filed: Sep. 6, 2006

(65) Prior Publication Data

US 2007/0067617 A1 Mar. 22, 2007

Related U.S. Application Data

(60) Provisional application No. 60/718,266, filed on Sep. 16, 2005.

(51) Int. Cl.
*G06F 7/04* (2006.01)
*G06F 12/14* (2006.01)

(52) U.S. Cl. .............................. 726/18; 713/2
(58) Field of Classification Search .................... 726/18; 713/2
See application file for complete search history.

(56) References Cited

U.S. PATENT DOCUMENTS

| | | | |
|---|---|---|---|
| 6,185,678 B1 | 2/2001 | Arbaugh et al. | |
| 6,327,652 B1 * | 12/2001 | England et al. | 713/2 |
| 6,330,670 B1 * | 12/2001 | England et al. | 713/2 |
| 6,938,164 B1 * | 8/2005 | England et al. | 713/193 |
| 7,082,507 B1 * | 7/2006 | Christie et al. | 711/163 |
| 7,243,230 B2 * | 7/2007 | England et al. | 713/168 |
| 7,302,698 B1 * | 11/2007 | Proudler et al. | 726/2 |
| 7,398,390 B2 * | 7/2008 | Hyser | 713/165 |
| 2001/0008015 A1 | 7/2001 | Vu et al. | |
| 2002/0023212 A1 * | 2/2002 | Proudler | 713/164 |
| 2003/0041255 A1 * | 2/2003 | Chen et al. | 713/193 |
| 2003/0182561 A1 * | 9/2003 | Challener et al. | 713/189 |
| 2003/0226031 A1 | 12/2003 | Proudler et al. | |
| 2004/0003288 A1 | 1/2004 | Wiseman et al. | |
| 2004/0053664 A1 | 3/2004 | Byrne | |
| 2004/0172542 A1 | 9/2004 | Minemura | |

(Continued)

FOREIGN PATENT DOCUMENTS

EP   1 076 279 A1   2/2001

(Continued)

OTHER PUBLICATIONS

Kuhlmann, Dirk et al. "Trusted Platforms, DRM, and Beyond", 2003.*

(Continued)

*Primary Examiner* — Michael Simitoski
(74) *Attorney, Agent, or Firm* — Alston & Bird LLP

(57) ABSTRACT

A method, apparatus, system and computer program product are provided for booting up a system using a secure boot framework. In particular, a secure boot mechanism (i.e., a mechanism that enforces that only authenticated programs and/or events are executed on a particular platform) is provided that has an unlimited number of authorized boot configurations, while requiring only a minimal amount of secure/confidential storage. The secure boot mechanism further provides for the separation of run-time and management functionality, which allows other authorization mechanisms to be plugged-in later on. In addition, the authorized secure boot configurations (i.e., the definition of the secure boot state) can be kept in insecure storage, such as a system disk (e.g., flash memory). Finally, the disclosed secure boot mechanism is further beneficial because it builds upon existing TCG techniques, causing it to require minimal implementation where TCG techniques are implemented.

41 Claims, 8 Drawing Sheets

U.S. PATENT DOCUMENTS

| | | | |
|---|---|---|---|
| 2004/0193873 A1 | 9/2004 | England | |
| 2005/0033978 A1 | 2/2005 | Hyser | |
| 2005/0033980 A1* | 2/2005 | Willman et al. | 713/200 |
| 2005/0091496 A1 | 4/2005 | Hyser | |
| 2005/0223221 A1 | 10/2005 | Proudler et al. | |
| 2005/0240998 A1* | 10/2005 | Cromer et al. | 726/22 |
| 2005/0283826 A1 | 12/2005 | Tahan | |
| 2006/0107032 A1* | 5/2006 | Paaske et al. | 713/2 |
| 2006/0155988 A1 | 7/2006 | Hunter et al. | |
| 2007/0006169 A1* | 1/2007 | Iliev et al. | 717/131 |

FOREIGN PATENT DOCUMENTS

| | | |
|---|---|---|
| JP | 2003 006027 A | 1/2003 |
| JP | 2003 108253 A | 4/2003 |
| JP | 2003 271254 A | 9/2003 |
| JP | 2004 046307 A | 2/2004 |
| JP | 2004 265026 A | 9/2004 |
| JP | 2004 265286 A | 9/2004 |

OTHER PUBLICATIONS

International Search Report from International Application No. PCT/IB2006/002472, dated Feb. 26, 2007.

Arbaugh, et al., *A Secure and Reliable Bootstrap Architecture*, 1997, pp. 65-71, University of Pennsylvania, Distributed Systems Laboratory, Philadelphia, PA.

TCG, TCG Specification Architecture Overview, Specification, Apr. 28, 2005, 54 pages, Revision 1.2, TCG.

ELX.com, Hacking the Xbox, pp. 1-2, Retrieved Sep. 14, 2005 from Internet Site https://www.elx.com/au/item/1593270291, ELX.com.

Office Action dated Feb. 1, 2010 for Korean Application No. 10-2008-7008995.

European Search Report from corresponding European Application No. 06 82 0749 dated Nov. 18, 2010.

Office Action from corresponding European Application No. 06 820 749.7 dated Dec. 1, 2010.

Office Action from corresponding Japanese Application No. 2008-530639 dated May 16, 2011 (English Translation).

Office Action from corresponding Japanese Application No. 2008-530639 dated May 16, 2011.

Chinese Office Action from corresponding Chinese Application No. 200680040523.2 dated Mar. 4, 2011.

English Translation of Chinese Office Action from corresponding Chinese Application No. 200680040523.2 dated Mar. 4, 2011.

Office Action Dated Jan. 12, 2012, for Chinese Application No. 200680040523.2.

Office Action for Japanese Patent Application No. 2008-530639, Dispatched on Mar. 26, 2012.

\* cited by examiner

SIMPLE SCALABLE AND CONFIGURABLE SECURE BOOT FOR TRUSTED MOBILE PHONES

CROSS-REFERENCE TO PROVISIONAL APPLICATION

The present application claims priority from U.S. Provisional Application No. 60/718,266 filed Sep. 16, 2005 and entitled "Simple Scalable and Configurable Secure Boot for Trusted Mobile Phones," the contents of which are hereby incorporated herein by reference in their entirety.

BACKGROUND

In general, in order to provide security, existing boot frameworks typically place a public key and a Root-to-Trust for Enforcement within an immutable storage. They then require that any image that the system boots from (e.g., an operating system) be signed with a digital signature using a private key corresponding to the public key. The public and private keys are global.

A drawback of this system is that it is inflexible. It does not allow fine-grained control of the boot process, and cannot be adapted to work with third-party management systems, since new images/events cannot be authorized securely on the device. In addition, images are not device-specific. For example, one image can be transferred from one device to another and still be verified by the same signature, since even though the image has been authorized to run on one device, the signature will also verify the image on another device.

A secure boot mechanism based on TCG technology using so-called Device Integrity Registers is briefly introduced by Siani Pearson et al, in "Trusted Computing Platforms: TCPA Technology in Context" (ISBN 0-13-009220-7) ("[TPCA]"). In general, the mechanism introduced in [TCPA] is limited in that it is neither scalable nor flexible. The mechanism does not allow a fine-granularity control of the boot-process, nor does it allow large amounts of secure configurations to be specified. Further, TCG requires that platform-identifying information not be placed in Platform Configuration Registers (PCRs) (discussed below). Where this requirement is followed, the solution suggested in [TCPA] does not allow binding of secure boot configurations to an individual system.

A need, therefore, exists for a method of creating an improved secure boot mechanism that is configurable yet simple. In particular, a need exists for creating such a secure boot mechanism in a setting where Trusted Computing Group (TCG) technology (e.g., a Trusted Platform Module (TPM)) is used.

BRIEF SUMMARY

Generally described, exemplary embodiments of the present invention provide an improvement over the known prior art by, among other things, providing a means for adding a simple, scalable, configurable and secure boot mechanism to a mobile device, such as a cellular telephone, personal digital assistant (PDA), personal computer (PC), laptop, pager, or the like, which may already contain features for handling sensitive information (e.g., cryptographic keys) and/or measuring system state and history in a trustworthy manner. Such features may include those specified by the TCG in TCG "TPM Main Part 1: Design Principles Version 1.2 Revision 62," October 2003 ("[TPM1]"); TCG "TPM Main Part 2: TPM Structures Specification Version 1.2 Revision 62," October 2003 ("[TPM2]"); and TCG "TPM Main Part 3: Commands Specification Version 1.2 Revision 62," October 2003 ("[TPM3]").

Unlike currently known secure boot mechanisms, exemplary embodiments of the present invention provide a secure boot mechanism (i.e., a mechanism that enforces that only authenticated programs and/or events are executed on a particular platform) having an unlimited number of authorized boot configurations, while requiring only a minimal amount of secure/confidential storage. Exemplary embodiments further provide for the separation of run-time and management functionality, which allows other authorization mechanisms to be plugged-in later on. In addition, according to exemplary embodiments, the authorized secure boot configurations (i.e., the definition of the secure boot state) can be kept in insecure storage, such as a system disk (e.g., flash memory). Exemplary embodiments of the present invention are further beneficial because they build upon existing TCG techniques, causing them to require minimal implementation where TCG techniques are implemented.

In accordance with one aspect of the invention, a method is provided for booting up a system using a secure boot framework. According to one exemplary embodiment the system comprising a computational engine and a secure environment operating within the computational engine and isolated from one or more programs, functions and resources operating outside the secure environment. The method of this exemplary embodiment may include: (1) executing a secure enforcement function located outside the secure environment, said secure enforcement function configured to ensure that only authorized program modules are executed on the system; and (2) executing at least one program module using the secure enforcement function, if the program module is authorized prior to execution.

In one exemplary embodiment, executing the secure enforcement function may involve creating an event associated with execution of the secure enforcement function that includes a code corresponding with the execution, and locating an event credential associated with the event, wherein the event credential includes an indication of the event as well as an indication of a system state in which the event is authorized. Executing the secure enforcement function may further involve first determining whether the event credential is authentic, and then determining whether the event is authorized based at least in part on the event credential. Finally, according to one embodiment, control is passed over to the secure enforcement function if the event credential is located and authentic, and the event is authorized.

In another embodiment, the event credential may further include a key store binding configured to bind the event credential to the secure environment and, in particular, to a key store located within the secure environment. In this exemplary embodiment, the step of determining whether the event credential is authentic may involve accessing the key store and determining the integrity and authenticity of the event credential based at least in part on the key store binding.

In yet another exemplary embodiment, the method may further include determining a current state of the system. According to this exemplary embodiment, the step of determining whether the event is authorized may include determine whether the event is authorized based at least in part on the current state of the system.

In one exemplary embodiment, the step of executing at least one program module using the secure enforcement function may similarly involve creating an event that is associated with execution of the program module and that includes a code corresponding with the execution of the program module; locating an event credential associated with the event, wherein the event credential includes an indication of the event and of a system state in which the event is authorized; determining whether the event credential is authentic; determining whether the event is authorized; and executing the program module if the event credential is located and authentic, and the event is authorized.

According to another aspect of the invention, an apparatus is provided that is configured to boot up using a secure boot framework. In one exemplary embodiment, the apparatus includes a computational engine and a secure environment operating within the computational engine and isolated from one or more programs, functions and resources operating outside the secure environment. The apparatus may further include a processor and a memory in communication with the processor, wherein memory stores an application executable by the processor. The application of this exemplary embodiment may be configured, upon execution, to: (1) execute a secure enforcement function that is located outside the secure environment and is configured to ensure that only authorized program modules are executed on the apparatus; and (2) execute at least one program module using the secure enforcement function, if the program module is authorized prior to execution.

According to yet another aspect of the invention, a system is provided that is configured to boot up using a secure boot framework. In one exemplary embodiment, the system includes a secure enforcement function that is operating outside the secure environment of the system and is configured to determine whether a program module is authorized for execution on the system and to execute the program module if the program module is authorized.

According to another aspect of the invention, a computer program product is provided for booting up a system using a secure boot framework. The system of one exemplary embodiment includes a computational engine and a secure environment operating within the computational engine and isolated from one or more programs, functions and resources operating outside the secure environment. The computer program product of this exemplary embodiment comprises at least one computer-readable storage medium having computer-readable program code portions stored therein. In one exemplary embodiment, the computer-readable program code portions may include: (1) a first executable portion for executing a secure enforcement function that is located outside the secure environment and is configured to ensure that only authorized program modules are executed on the system; and (2) a second executable portion for executing at least one program module using the secure enforcement function, if the program module is authorized prior to execution.

According to yet another aspect of the invention, an apparatus is provided that is configured to boot up using a secure boot framework. In one exemplary embodiment the apparatus includes a computational engine and a secure environment operating within the computational engine and isolated from one or more programs, functions and resources operating outside the secure environment. The apparatus of this exemplary embodiment may further include a means for executing a secure enforcement function that is located outside the secure environment and is configured to ensure that only authorized program modules are executed on the system; and means for executing at least one program module using the secure enforcement function, if the program module is authorized prior to execution.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Part I: General Description
Secure Boot Framework

Figure 1:
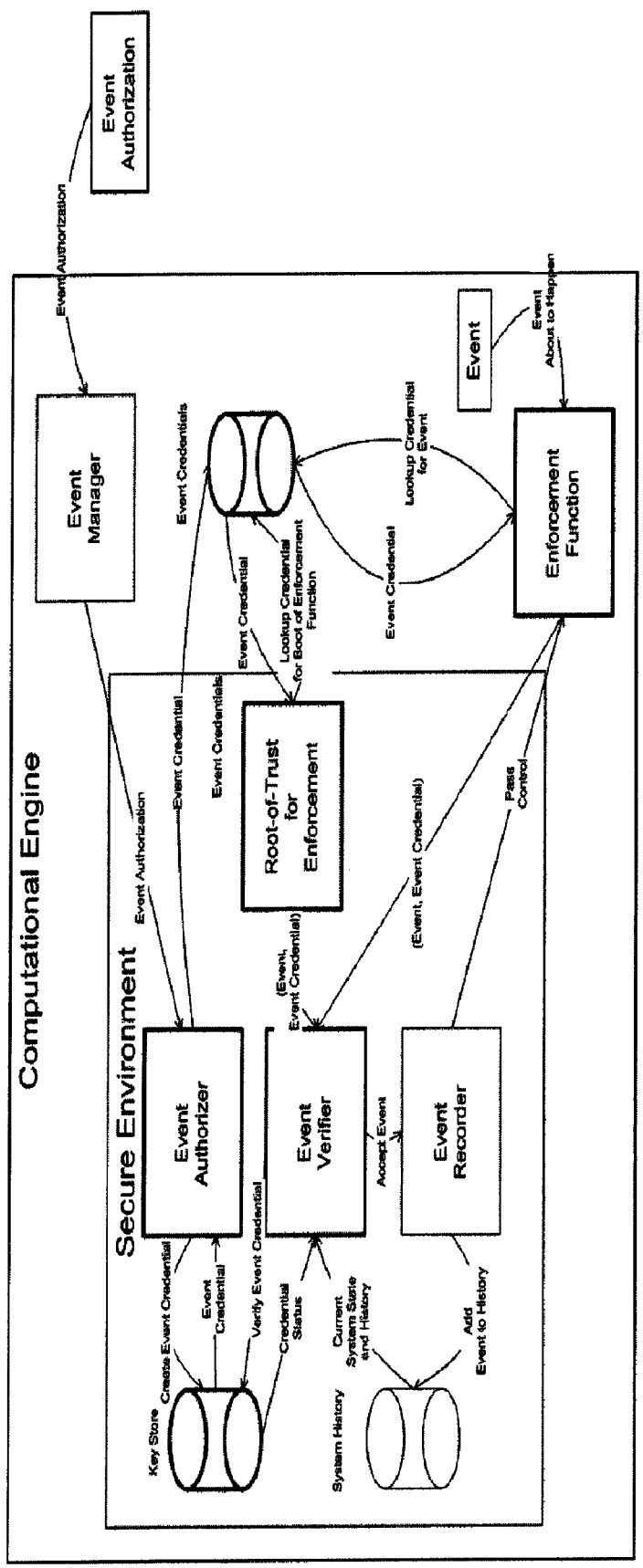
FIG. 1 is a block diagram of a secure boot framework in accordance with exemplary embodiments of the present invention.

FIG. 1 provides an illustration of the main structural elements of a secure boot framework, which may be implemented, for example on a mobile device, for the purpose of providing a secure boot-up process, in accordance with exemplary embodiments of the present invention. As shown, the architecture may include a Computational Engine comprising, in essence, a general purpose computer having a memory, volatile or non-volatile (e.g., Read Only Memory (ROM), Random Access Memory (RAM), Electrically Erasable Programmable ROM (EEPROM), flash memory, hard disk, etc.), a central processing unit (CPU), and any other resources recognized by those of ordinary skill in the art as necessary or useful.

Within the Computational Engine is a Secure Environment that is isolated from the programs, functions or resources located or operating outside of the Secure Environment. As used herein, the term "secure," when used as a modifier, indicates that the program, function, memory, or other object being modified, is immutable and/or confidential. The Secure Environment created by the TCG is a Trusted Platform Module (TPM), which is essentially an additional chip that can be included with the computing device to enable trusted computing features. In exemplary embodiments, the isolation may be based on hardware alone, software alone, or some combination thereof. The functions and programs operating within the Computational Engine may call certain defined functions operating inside the Secure Environment, and the Secure Environment may share the CPU with programs inside the Computational Engine. However, where the CPU is shared, resources inside the Secure Environment must only be accessible to functions and programs when that CPU is executing program code from within the Secure Environment. In this case, when the CPU is shared, the isolation must be implemented in such a manner that programs and functions outside the Secure Environment are unable to affect resources and programs inside the Secure Environment, except through well-defined functions.

A Root-of-Trust for Enforcement (RTE) is included in the Secure Environment. The RTE is the first program to execute within the overall system, and it must be authentic, but it need not be confidential. In other words, while the RTE can be viewed by anyone, it must be set up such that no one can change it. In order to ensure authenticity, the RTE should be made immutable. In one exemplary embodiment this may be accomplished by storing the RTE program in Read Only Memory (ROM). In general, the purpose of the RTE is to ensure that a secure Enforcement Function, which is discussed in detail below, is executed outside the Secure Environment.

Also included in the Secure Environment is an Event Verifier that checks whether an Event is allowed based on the Event Credential and the current system state. In general, an Event is a description of an event that affects security of the boot process. In particular, an Event is a code that represents any event that can impact the security placed in the system. Examples of such events could be the loading of a program, device driver or operating system, or placing the system in debug or maintenance mode. In the common case, an Event is a codified representation of the load and execution of a code image. For example, the Event may be a cryptographic hash (e.g., Secure Hash Algorithm 1 (SHA1)) of the code image to be executed, possibly prefixed by a string, such as "load." In the case where a certain piece of code is loaded, the code (and often its configuration) is included in the syntax of the Event. However, in other cases, such as entering debug mode, an event may be represented by, e.g., SHA1 ("entering debug mode"). Because an event such as entering debug mode would be recorded in the System History, it would cause a set of Event Credentials from being valid and it could also cause Sealed data (discussed below) to be undecryptable.

An Event Credential is an authenticated data structure that allows the execution of a certain event in a certain system state, both of which are defined within the credential (See FIG. 4 and related description below). In general, an Event Credential is expected to be bound to a single instance of a Secure Environment.

In order to check whether an Event Credential allows an event, the Event Verifier checks the authenticity of the Event Credential and then analyzes the current system state (as indicated in the System History, discussed below), the event, and the Event Credential. If an event is allowed, control is passed back to the Enforcement Function via an Event Recorder (discussed below). Where an event is not allowed, the system may be halted (e.g., shut down) or the Enforcement Function can be told to not execute or allow the event. The decision whether to allow an event or not, in one exemplary embodiment, is based on the Event Credentials used by the Event Verifier. The Event Credentials are generally set up in such a manner as to only allow authorized images to boot. For example, an unauthorized event (i.e., no authentic Event Credential is present) about to take place could represent an attempt to boot an unauthorized operating system or boot an operating system in an unauthorized manner.

The Secure Environment further comprises a Key Store and a System History. The Key Store may be used to check the authenticity and integrity of Event Credentials and possibly event authorizations. The authenticity and integrity of Event Credentials and event authorizations may be checked using any message authentication mechanism, such as digital signatures, message authentication codes, or the like, which can be used to authenticate the event. The System History contains a representation of the current system state and history. This is updated by an Event Recorder (discussed below) and used by the Event Verifier when deciding whether an event is allowed.

An Event Recorder is also included in the Secure Environment in exemplary embodiments of the present invention. The Event Recorder records events that the Event Verifier has allowed. The events are recorded into the System History, and the Event Recorder passes control back to the Enforcement Function.

In exemplary embodiments, the Enforcement Function, an Event Credential Store, and an Event Manager are each located outside the Secure Environment, while an Event Authorizer may be located either within the Secure Environment (as shown) or outside the Secure Environment (not shown). The Enforcement Function is a program running outside the Secure Environment that ensures that, before events are created, the Event Verifier is used to authorize them. Prior to passing the event and an Event Credential to the Event Verifier for authorization, the Enforcement Function may look up the correct Event Credential from the Event Credential Store. The Enforcement Function may also handle the return from the Secure Environment (i.e., the Event Verifier and/or the Event Recorder) and comply with any approve/deny decision. In the instance where an event is accepted, the Enforcement Function returns control to the calling party that generated the event. Alternatively, where the event is denied, the Enforcement Function may decide to halt the whole system or the subsystem that is generating the event, or it may, together with the event generator, ensure that the event is aborted. The options available to the Enforcement Function when an event is generated depend on the level of cooperation between the event generator and the Enforcement Function. It is generally assumed that the Enforcement Function, RTE and Event Credentials ensure that only such code modules that cooperate correctly with the Enforcement Function are executed. In addition, the RTE ensures that only an Enforcement Function that acts correctly is booted when the system is started. A system may have several Enforcement Functions, e.g., one for an operating system and one for a virtual machine, such as Java.

In one exemplary embodiment, the Event Credential Store comprises storage for the Event Credentials within the Computational Engine. Each individual Event Credential may be authenticated by the Key Store, enabling it to be stored outside of the Secure Environment. The Enforcement Function and RTE can then access the Event Credential Store in order to obtain individual Event Credentials.

In one exemplary embodiment, the Event Authorizer accepts Event Authorizations from the Event Manager, verifies that they are from an authentic source, and then passes them to the Event Credential Store for storage. The Event Authorizer may check that the event authorization was provided by an authenticated Event Manager (e.g., approved using the Enforcement Function and Event Credential Store) by consulting the System History. Alternatively, the Event Authorizer may check that the event authorizations have been authorized by some third party using, for example, a digital signature or a message authentication code. The Key Store may be used to bind the event authenticators to the Secure Environment in such a manner that authenticity and integrity can later be checked by the Key Store when the Event Verifier is checking an event given to it by the RTE or the Enforcement Function.

According to exemplary embodiments of the present invention, the Event Manager receives event authorizations, checks whether they are authentic, and, if so, passes them to the Event Authorizer for addition to the Event Credentials Store. The Event Manager may receive the event authorizations via an over the air (OTA) device management protocol, such as OMA Device Management.

An event authorization is similar to an Event Credential, though, unlike the Event Credential, it is not bound to a single instance of a Secure Environment. In contrast, an event authorization may be bound to a third-party management agent, for example. In this case, the Event Manager would check the event authorization and transform it to an Event Credential using the Event Authorizer. In some instances, the event authorization can also be a valid Event Credential.

General Boot and Management Process

The following describes a boot process according to exemplary embodiments of the present invention, wherein the secure boot mechanism framework discussed above is utilized. The booting process can be divided into two phases: (1) booting the Enforcement Function; and (2) executing the Enforcement Function throughout the lifetime of the system.

Booting the First Enforcement Function

Figure 2:
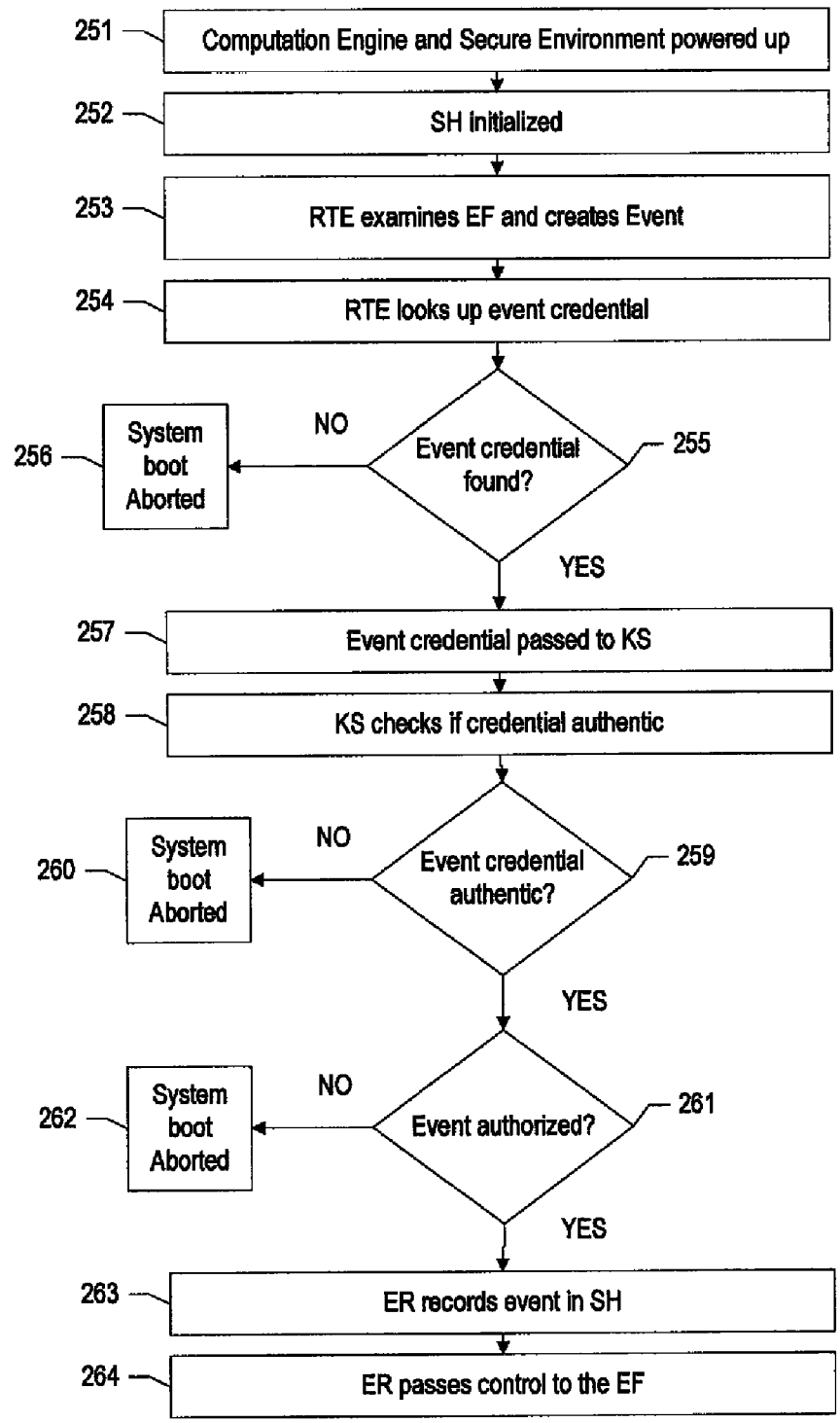
FIG. 2 is a flow chart illustrating the steps which could be taken when implementing the first phase of a secure boot up process in accordance with exemplary embodiments of the present invention.

Reference is made to FIG. 2, which provides a flow chart illustrating the steps taken when booting the Enforcement Function in the first phase of the booting process in accordance with one exemplary embodiment of the present invention. As shown, the process begins at Step 251 where the Computational Engine and the Secure Environment are powered up. In Step 252, the System History (SH) is initialized to represent that the system has just powered up. Next, the RTE function is executed within the context of the secure environment (Steps 253 and 254).

In particular, the RTE first examines the Enforcement Function that is to be executed, and then creates the event (e.g., EF1_BOOT) of its execution (Step 253). In Step 254, the RTE looks up the Event Credential (e.g., EF1_CRED) in the Event Credential Store (EC) corresponding to the event (EF1_BOOT). If the Event Credential (EF1_CRED) is not found in the EC (based on the determination made in Step 255), the system boot is aborted (Step 256). In contrast, where the Event Credential (EF1_CRED) is found in the EC, the RTE passes the Event Credential (EF1_CRED) to the Key Store (KS) for determining whether the Event Credential is authentic (Steps 257, 258 and 259).

If the Event Credential (EF1_CRED) is not authentic, the system boot is again aborted (Step 260). Alternatively, where the Event Credential is authenticated by the KS, the Event Verifier (EV) determines whether the Event Credential (EF1_CRED) authorizes the event (EF1_BOOT) given the current system state provided in the SH (Step 261). Where the event (EF1_BOOT) is not authorized (i.e., where the EF1_CRED does not allow the EF1_BOOT in the present state), the system boot is aborted in Step 262. Alternatively, where EF1_CRED (the Event Credential) is authentic (as determined in Step 259) and allows EF1_BOOT (the event), control is passed to the Event Recorder (ER), which records the event (EF1_BOOT) in the SH (Step 263). Finally, in Step 264, the ER passes control to the EF, and the resources inside the Secure Environment are not accessible until the Secure Environment is executing.

Executing Enforcement Function

The Enforcement Function, together with the elements of the Secure Environment, discussed above, ensure that only programs that correctly request authorization for events from the Enforcement Function are booted. Programs that do not do this must be isolated, for example by the operating system, such that they do not have access to sensitive resources that may impact the security or trustworthiness of the computational environment. The Enforcement Function and the operating system may use standard techniques, such as a virtual memory and CPU privilege levels, to ensure that programs and code that do not cooperate with the Enforcement Function do not have access to sensitive resources or functions.

Figure 3:
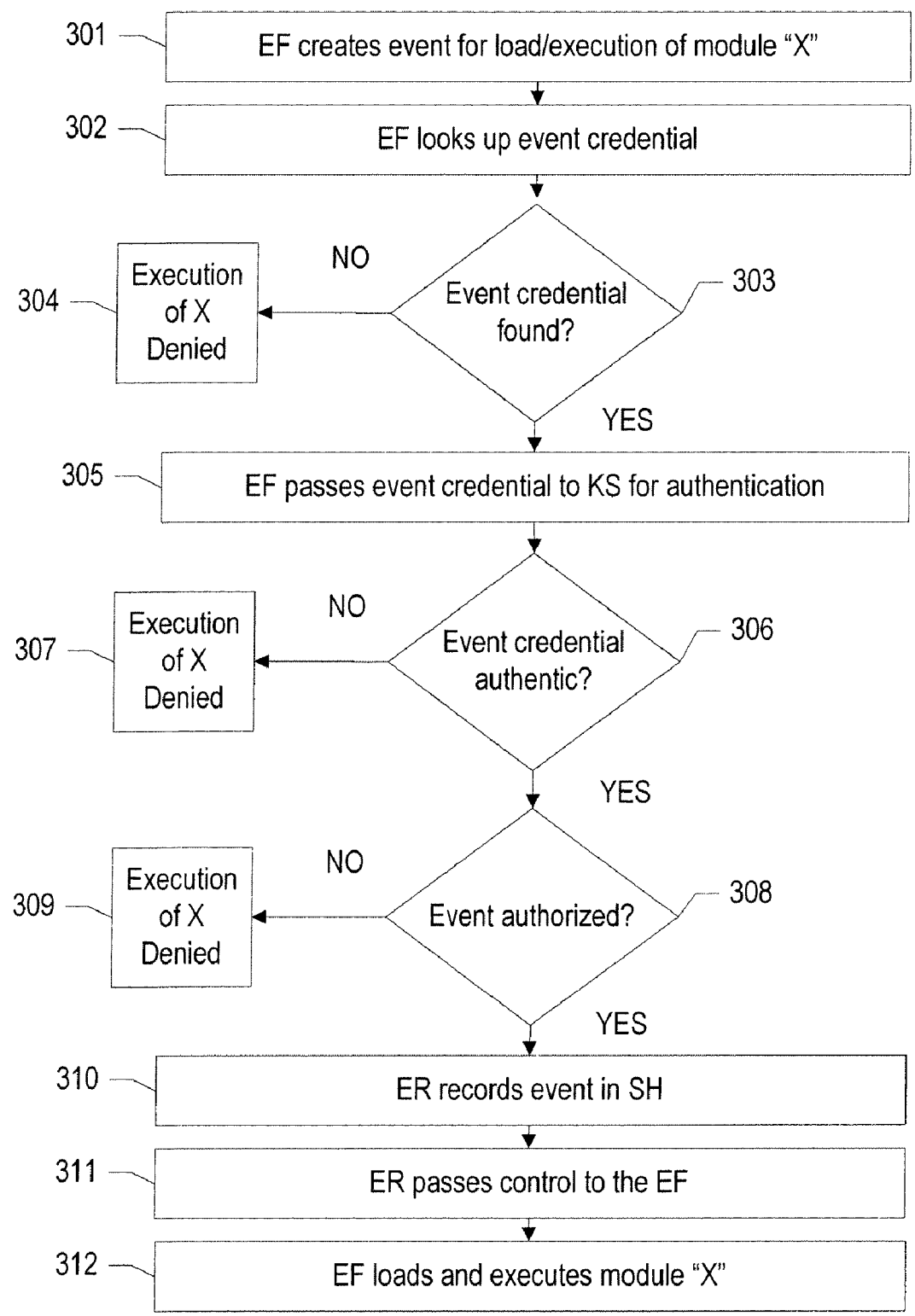
FIG. 3 is a flow chart illustrating the steps which could be taken when implementing the second phase of a secure boot up process in accordance with an exemplary embodiment of the present invention.

When the Enforcement Function initially boots up (for example, in the manner described above), it is configured with a set of programs to boot (e.g., a bootstrap loader or boot loader, the operating system, etc.). The Enforcement Function is then responsible for generating an event for each load and executing the code that affects the secure boot. FIG. 3 provides a flow chart illustrating the steps which may be taken when loading and executing code module "X," or execution of event "X" (e.g., entering Debug Mode), according to exemplary embodiments of the present invention. In other words, FIG. 3 illustrates the second phase of the booting process, illustrating how the Enforcement Function is executed throughout the lifetime of the system.

In Step 301, the Enforcement Function (EF) first creates an event (e.g., EV_X) for the loading and execution of the module X. Next, the EF looks up an Event Credential (e.g., X_CRED) in the Event Credential Store (EC) that corresponds to the event (EV_X) (Step 302). Where the Event Credential (X_CRED) is not found, the execution of module X is denied (Step 304, based on determination made in Step 303). Alternatively, where the Event Credential (X_CRED) is found in the EC, the process continues to Step 305, in which the EF passes the Event Credential (X_CRED) to the Key Store (KS) for determining whether the Event Credential is authentic (Step 306). If the Event Credential (X_CRED) is not authentic, the execution of module X is again denied (Step 307).

Where the KS determines that the Event Credential (X_CRED) is authentic, the Event Verifier (EV) checks whether the Event Credential authorizes the event given the system state provided in the System History (SH) (i.e., EV determines whether X_CRED authorizes EV_X given the system state) (Step 308). If the Event Credential (X_CRED) does not allow the event (EV_X) given the state, the execution of X is denied (Step 309). However, where X_CRED is authentic (as determined in Step 306) and it allows EV_X, control passes to the Event Recorder (ER), which records the event (EV_X) in the SH (Step 310).

In Step 311, control then passes back to the Enforcement Function (EF), which then loads and executes module X (Step 312). The EF can then resume execution in Step 301 when another event requires authorization. Where an event has been denied (e.g., in Steps 304, 307 or 309), if the EF has no alternatives available for code to execute, it will likely have no option but to shut itself down, or else start waiting for future events. Where no future events are expected, the EF again likely has no option but to shut itself down. Effectively this could mean shutting the system down or rendering it unusable.

Managing the Event Credentials

Figure 4:
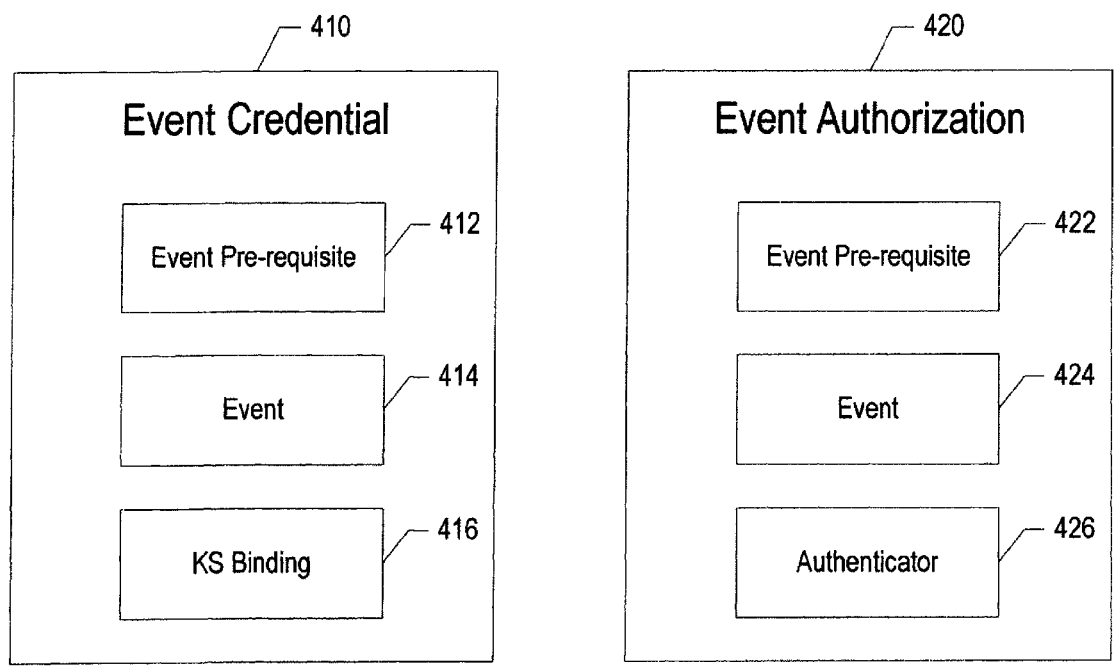
FIG. 4 is a block diagram of an Event Credential and an Event Authorization in accordance with exemplary embodiments of the present invention.

FIG. 4 is a block diagram of an Event Credential 410 and an event authorization 420 in accordance with exemplary embodiments of the present invention. As shown, the event credential 410 may include an Event Pre-requisite field 412, an Event field 414, and a Key Store (KS) Binding field 416. In one exemplary embodiment, the Event field provides a definition of the event. As stated above, an event may be a codified representation of the load and execution of a code image (e.g., a cryptographic hash of the code image to be executed). The Event Pre-requisite field describes the conditions under which an event is allowed (e.g., this event may only be allowed where certain other events have already been executed) and may, in one exemplary embodiment, be integrated into the Event field. The KS Binding field binds the Event Credential and its contents to the Key Store. As discussed above, this allows the KS to check the integrity and authenticity of the Event Credential. As will be understood by those of ordinary skill in the art, any number of protocols and methods may be used to provide this binding feature.

The event authorization 420 differs from the Event Credential 410 primarily in how the authentication and integrity of the structure is checked. Because it is expected that any secure device management solution is deployable for this purpose, the form of the event authorization depends heavily on how the Event Manager is instantiated. For example, for addressing (i.e., identifying the mobile phones), one system may address the devices using International Mobile Equipment Identification (IMEI) code, another may use a proprietary code. For protecting the secure boot configuration, some systems may use a digital signature based on Public Key Infrastructure (PKI), while another system may use shared secrets stored in a tamper-resistant storage.

Figure 5:
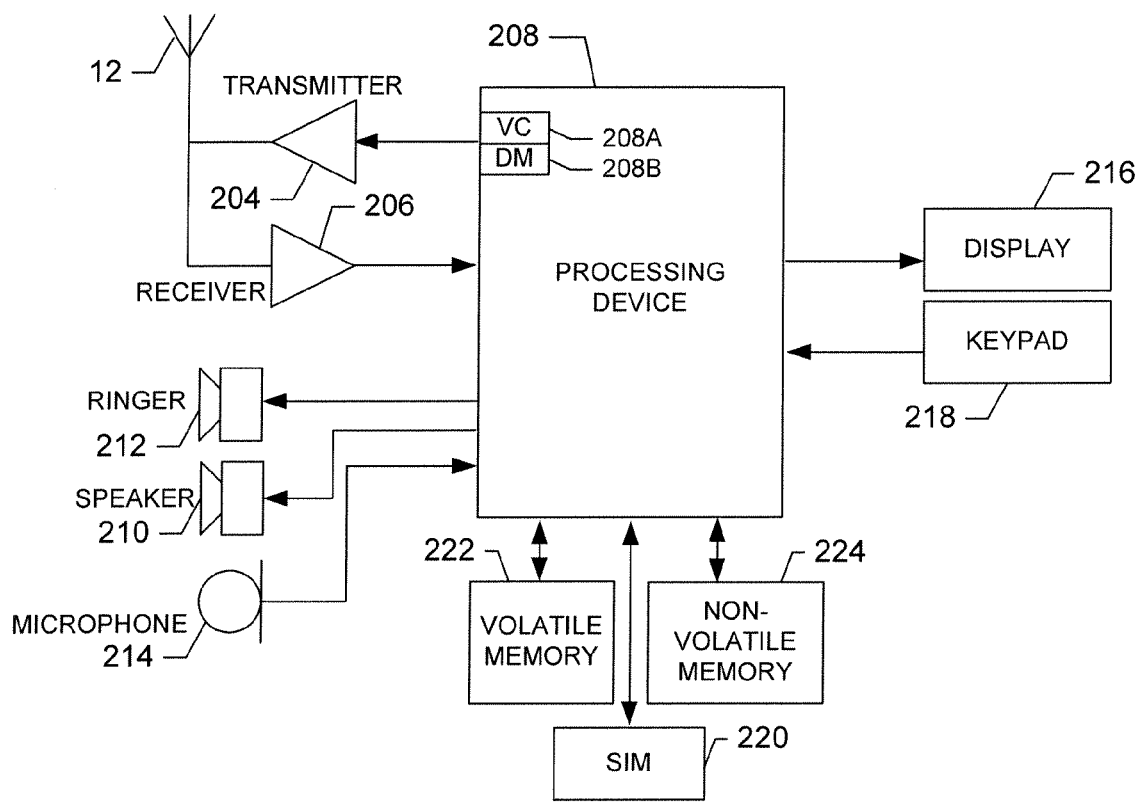
FIG. 5 is a block diagram of a mobile device capable of operating in accordance with exemplary embodiments of the present invention.

Mobile Device that May Comprise Secure Boot Framework:

Reference is now made to FIG. 5, which illustrates one type of mobile device that would benefit from embodiments of the present invention. In particular, FIG. 5 illustrates a mobile device on which the above described secure boot framework is capable of being operated. It should be understood, however, that the mobile device illustrated and hereinafter described is merely illustrative of one type of mobile device that would benefit from the present invention and, therefore, should not be taken to limit the scope of the present invention. While several embodiments of the mobile device are illustrated and will be hereinafter described for purposes of example, other types of mobile devices, such as personal digital assistants (PDAs), pagers, laptop computers and other types of electronic systems including both mobile, wireless devices and fixed, wireline devices, can readily employ embodiments of the present invention.

The mobile device includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 5, in addition to an antenna 12, the mobile device 10 includes a transmitter 204, a receiver 206, and means, such as a processing device 208, e.g., a processor, controller or the like, that provides signals to and receives signals from the transmitter 204 and receiver 206, respectively. These signals include signaling information in accordance with the air interface standard of the applicable cellular system and also user speech and/or user generated data. In this regard, the mobile device can be capable of operating with one or more air interface standards, communication protocols, modulation types, and access types. More particularly, the mobile device can be capable of operating in accordance with any of a number of second generation (2 G), 2.5 G and/or third-generation (3 G) communication protocols or the like. Further, for example, the mobile device can be capable of operating in accordance with any of a number of different wireless networking techniques, including Bluetooth, IEEE 802.11 WLAN (or Wi-Fi®), IEEE 802.16 WiMAX, ultra wideband (UWB), and the like.

It is understood that the processing device 208, such as a processor, controller or other computing device, includes the circuitry required for implementing the video, audio, and logic functions of the mobile device and is capable of executing application programs for implementing the functionality discussed herein. For example, the processing device may be comprised of various means including a digital signal processor device, a microprocessor device, and various analog to digital converters, digital to analog converters, and other support circuits. The control and signal processing functions of the mobile device are allocated between these devices according to their respective capabilities. The processing device 208 thus also includes the functionality to convolutionally encode and interleave message and data prior to modulation and transmission. The processing device can additionally include an internal voice coder (VC) 208A, and may include an internal data modem (DM) 208B. Further, the processing device 208 may include the functionality to operate one or more software applications, which may be stored in memory. For example, the controller may be capable of operating a connectivity program, such as a conventional Web browser. The connectivity program may then allow the mobile device to transmit and receive Web content, such as according to HTTP and/or the Wireless Application Protocol (WAP), for example.

The mobile device may also comprise means such as a user interface including, for example, a conventional earphone or speaker 210, a ringer 212, a microphone 214, a display 216, all of which are coupled to the controller 208. The user input interface, which allows the mobile device to receive data, can comprise any of a number of devices allowing the mobile device to receive data, such as a keypad 218, a touch display (not shown), a microphone 214, or other input device. In embodiments including a keypad, the keypad can include the conventional numeric (0-9) and related keys (#, *), and other keys used for operating the mobile device and may include a full set of alphanumeric keys or set of keys that may be activated to provide a full set of alphanumeric keys. Although not shown, the mobile device may include a battery, such as a vibrating battery pack, for powering the various circuits that are required to operate the mobile device, as well as optionally providing mechanical vibration as a detectable output.

The mobile device can also include means, such as memory including, for example, a subscriber identity module (SIM) 220, a removable user identity module (R-UIM) (not shown), or the like, which typically stores information elements related to a mobile subscriber. In addition to the SIM, the mobile device can include other memory. In this regard, the mobile device can include volatile memory 222, as well as other non-volatile memory 224, which can be embedded and/or may be removable. For example, the other non-volatile memory may be embedded or removable multimedia memory cards (MMCs), Memory Sticks as manufactured by Sony Corporation, EEPROM, flash memory, hard disk, or the like. The memory can store any of a number of pieces or amount of information and data used by the mobile device to implement the functions of the mobile device. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content. The memory may, for example, store computer program code for an application and other computer programs. For example, in one embodiment of the present invention, the memory may store computer program code for performing the functionality of the Event Authorizer, Event Verifier, Event Recorder, Root-of Trust for Enforcement, Event Manager and/or Enforcement Function, as discussed in detail above.

In exemplary embodiments, the mobile device may further embody an isolated Secure Environment for implementing the Secure Environment described herein. This isolated Secure Environment may be implemented using dedicated hardware, software, or a combination of hardware and software. Examples of such environments include TPMs built by a variety of manufacturers (for example Infineon and Atmel), or "Secure Mode" virtualization technology, such as that present in the ARM TrustZone solution.

The mobile device of exemplary embodiments of the present invention is primarily described in conjunction with mobile communications applications. It should be understood, however, that the mobile device of embodiments of the present invention can be utilized in conjunction with a variety of other applications, both in the mobile communications industries and outside of the mobile communications industries. For example, the mobile device of exemplary embodiments of the present invention can be utilized in conjunction with wireline and/or wireless network (e.g., Internet) applications.

Part II: Exemplary Trusted Working Group (TCG)-Compatable Embodiment

The following provides a description of exemplary embodiments of the present invention, wherein the above-described secure boot framework is implemented on a mobile device having TCG-like features, including, for example, a TCG Trusted Platform Module (TPM).

TCG-Defined System History

In general, TCG TPM measures the state of the system using a set of Platform Configuration Registers (PCRs), which are 160-bit registers contained in the TPM. The number of PCRs contained in the TPM (e.g., 16 or 24) depends on the version of the TPM implemented. Each PCR contains a Secure Hash Algorithm 1 (SHA1) of an event, which can be updated using a so-called TPM_Extend command. The following provides a description of the TPM_Extend command:

Let PCR[ ] represent the array of PCRs stored inside the TPM (e.g. PCR[0] is PCR register $\mathbf{0}$, PCR[1] is register $\mathbf{1}$, and so on). Let SHA1(x) denote the SHA1 hash of the bit-string x. Let i be a valid PCR index, and let ev be a 160-bit value representing an event to be recorded. Let old=PCR[i] be the current value of PCR register i. TPM_Extend assigns to PCR [i] the value SHA1 (old $\mu$ ev), i.e. PCR[i]:=SHA1 (old $\mu$ ev).

The SHA1 function is assumed to be a strong cryptographic hash function. Based on that, the following two properties are assumed: (1) Given a PCR register state PCR[i] and a 160-bit value x, it is infeasible to find a value ev that would cause TPM_Extend to assign x to PCR[i]; (2) It is infeasible to find two sequences of events that would cause the same value to be assigned to a PCR register by iterating over them with TPM_Extend( ).

Based on the foregoing, it is implied that the set of PCR registers describes the system state in terms of the TPM_Extend operations (i.e., the sequence of events that have been recorded). The intent is that events generated by or related to different aspects of the system are extended into different PCRs, though this is up to the system software.

TCG-Compatible Events, System History and Event Credentials

Assume the number of PCR registers is n. The objects within the secure boot framework now become: (1) The System History is a set of n PCR registers (e.g., 16 or 24); (2) the Event is a pair (i.e., PCR index i, 160-bit integer ev); (3) the Event Credential is also a pair—State Descriptor and Key Store (KS) Binding; and (4) the Event Authorization is a pair including the State Descriptor and the Authenticator. A State Descriptor is an array PCR[ ] of n PCR register values and an array of PCR_CMP[ ] of n comparison operation definitions. PCR_CMP[i] corresponds to the PCR with index i. The values of PCR CMP[ ] can be "equals," or "don't care."

Because of the assumptions placed on the TPM_Extend ( ) operation described in the previous section (e.g., the assumption that the SHA1 function is a strong cryptographic hash function), it is not necessary to store a separate Event Pre-Requisite in the Event Credential or Authenticator, since the State Descriptor is assumed to identify the system history.

Figure 6:
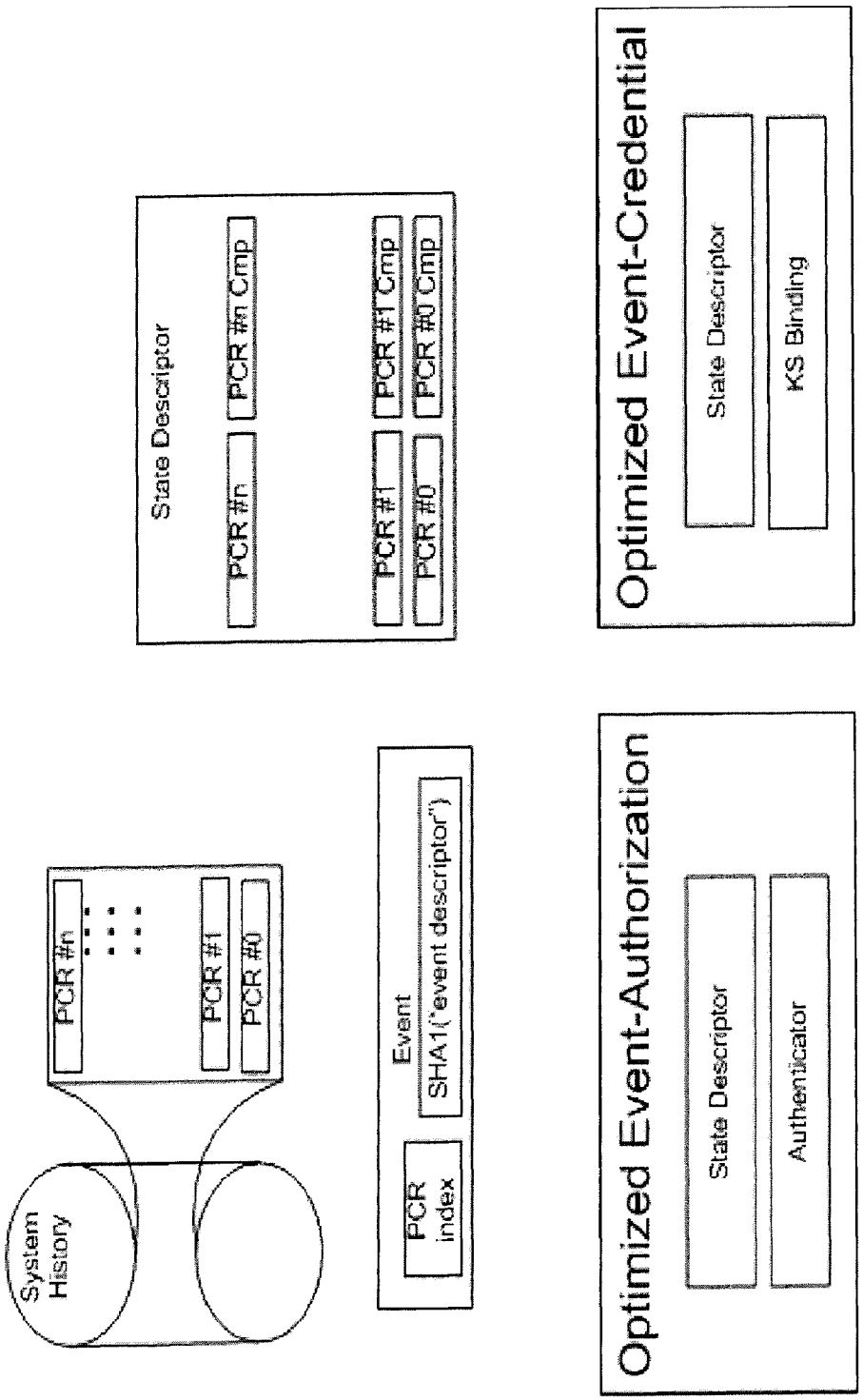
FIG. 6 is a block diagram of a TCG-compatible Event Authorization and Credential in accordance with exemplary embodiments of the present invention.

FIG. 6 illustrates a TCG-compatible Event Credential and Authorization as discussed above.

TCG_Compatible RTE, Event Verifier and Enforcement Function

Event Credential Store

Assume an event consists of the pair <PCR index, 160-bit integer>, the Event Credential consists of <state descriptor, KS Binding>, and the State Descriptor consists of the array of PCRs, and the array of comparison operations, as discussed above. An EC_LOOKUP (event, system history) operation tries to find an authorizing Event Credential. Essentially, the procedure simulates a TPM_Extend ( ) operation being performed on the PCR[ ] array, and then compares the result with the state descriptor PCR values based on the instruction in the PCR_CMP[ ] array.

In one exemplary embodiment, the EC_LOOKUP( ) proceeds as described hereafter. First, let the event be <i, event> and the system history be the array PCR[ ] of size n. For each Event Credential EC=<state descriptor, KS Binding> in the Event Credential, do the following: (1) let the state descriptor in EC consist of the array SD_PCR[ ] of the PCR values and the array SD_CMP[ ] of the comparison operations; (2) create a temporary array TMP_PCR[ ]:=PCR[ ] as a copy of the current system history; (3) let TMP_PCR[i]:=SHA1(PCR[i] $\mu$ event); (4) for index :=0 to n−1, if SD_CMP [index]=='equals,' and SD_PCR[index] !=TMP_PCR [index] then proceed to the next credential and go to (1); and (5) return the credential EC if the above check did not cause a jump to (1). Finally, a failure is returned if there are no more Event Credentials to check and a matching one has not been returned. To clarify, if SD_CMP[index] equals 'equals,' then the state descriptor requires that the PCR with index 'index' end up with value SD_PCR[index] after the event fires. If SD_CMP[index] does not equal 'equal,' it implies a value of 'don't care' (as there were only two options), and, therefore, the PCR with index 'index' can be skipped in order to proceed to the next one.

TCG-Compatible Boot of the Enforcement Function

Figure 7:
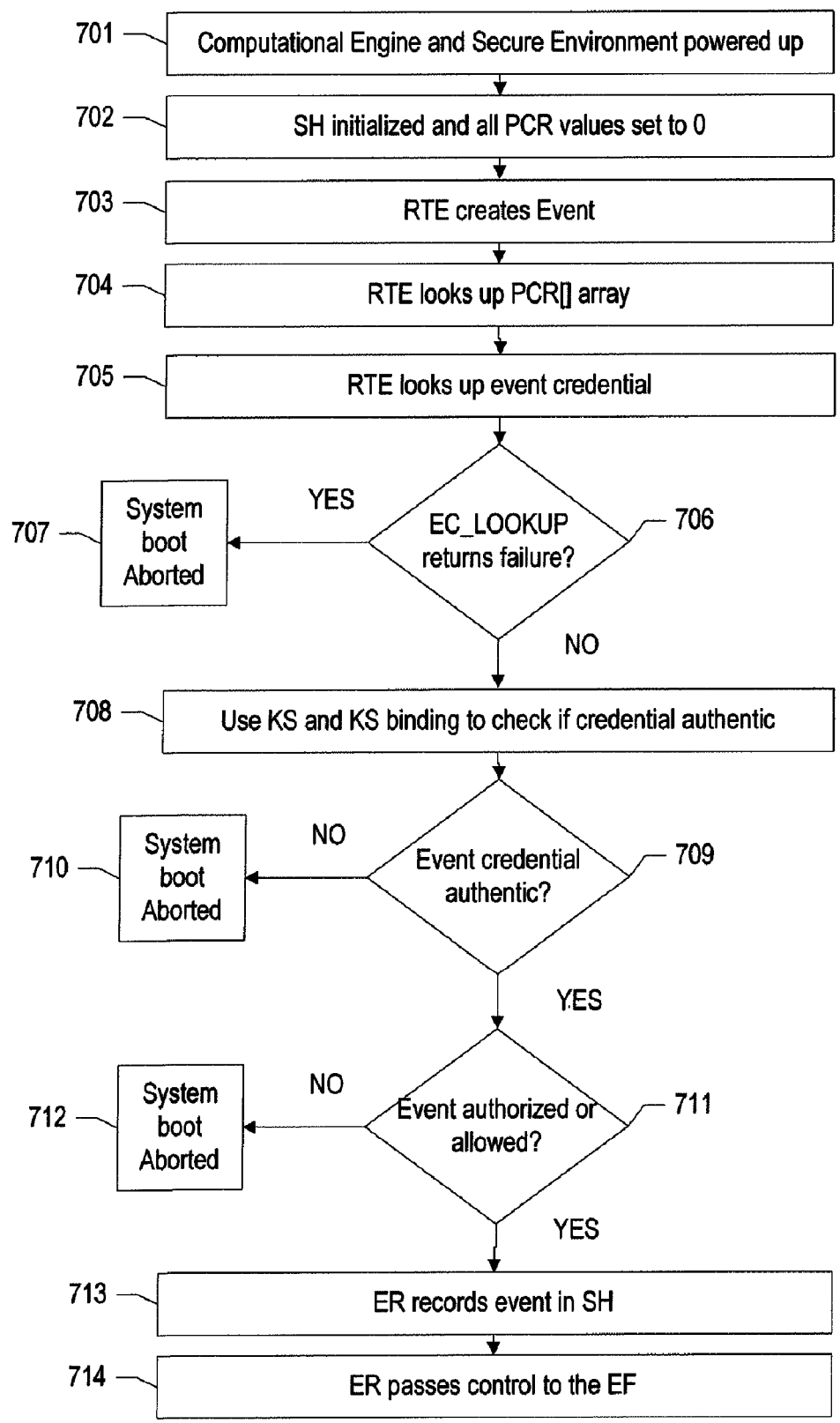
FIG. 7 illustrates a TCG-compatible boot of the Enforcement Function in accordance with exemplary embodiments of the present invention.
Figure 8:
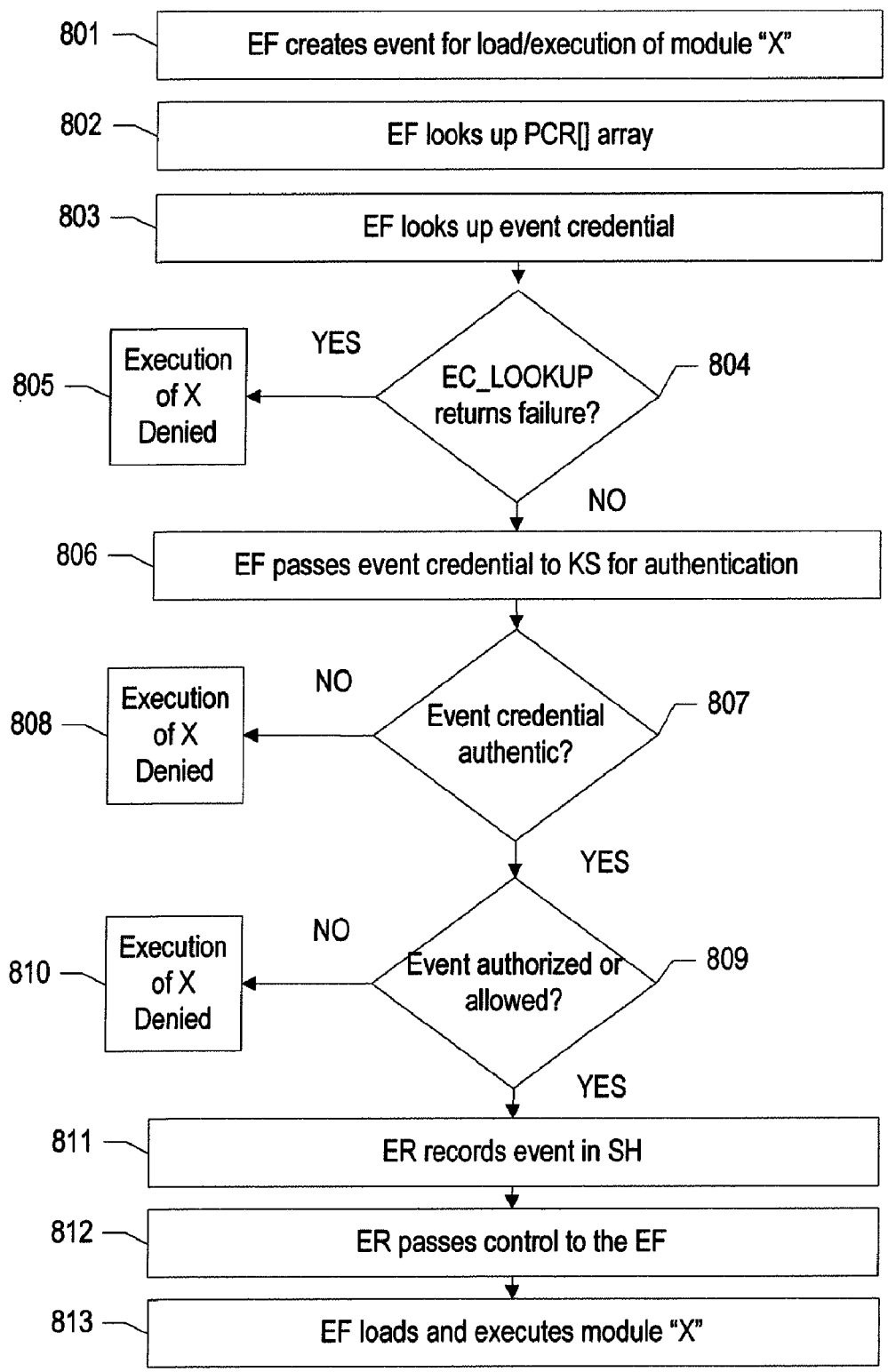
FIG. 8 illustrates the steps which could be taken in operating the Enforcement Function in a TCG-compatible environment in accordance with exemplary embodiments of the present invention.

The following describes how, in a TCG-compatible way, the RTE may boot the Enforcement Function (EF) in accordance with one exemplary embodiment of the present invention. The steps of the process are illustrated in FIG. 7. In general, the RTE need only locate a suitable credential and then allow the boot to proceed.

More specifically, the process begins in Step 701, when the Computational Engine and the Secure Environment are powered up. Next, the System History (SH) is initialized and all PCR values are set to 0 (Step 702). The RTE function can then be executed within the context of the secure environment. In particular, in Step 703, the RTE creates the event EF1_BOOT representing the boot of the EF. This event can be, for example, a PCR index 0 and a SHA1 hash of the string "boot" concatenated with the EF code image, e.g., <0, SHA1 ("boot" || EF code)>.

Next the RTE, in Step 704, looks up the PCR[ ] array from the SH and, in Step 705, looks up an Event Credential EF1_CRED :=EC_LOOKUP(EF1_BOOT, PCR[ ]). If EC_LOOKUP returns a failure, then the system boot is aborted (Step 707). Alternatively, where EF1_CRED was found and allows EF1_BOOT, the Key Store (KS) and the KS Binding is used to check that EF1_BOOT credential is authentic (Step 708). If the Event Credential is not authentic, the system boot is again aborted (Step 710), and the RTE may remove the credential from the Event Credential Store (EC). Where the Event Credential is authentic, it is determined whether the event is allowed, based on the Event Credential and the system state (Step 711). If the event is not allowed or authorized, the system boot is aborted in Step 712. However, where the EF1_CRED was found, is authentic, and allows EF1_BOOT, control is passed to the Event Recorder (ER), which records the EF1_BOOT in the System History (SH) (Step 713). Finally, in Step 714, the ER passes control to the EF and the resources inside the secure environment are no longer accessible.

Enforcement Function Operation

In general, the Enforcement Function (EF) of exemplary embodiments of the present invention operates in a straightforward manner. Two notable points, however, are that the check for authenticity may be done inside the Event Verifier (EV), and that the state history and state descriptor comparisons may be done both outside the Secure Environment (by the EF) and within the Secure Environment (by the EV).

The following provides the steps which may be taken in operating the EF in accordance with exemplary embodiments of the present invention. First, in Step 801, the EF creates an event (EV_X) for the load/execution of the module X. Next, in Step 802, the EF looks up the PCR[ ] array from the SH. The EF then looks up an Event Credential X_CRED := EC_LOOKUP(EV_X, PCR[ ]) (Step 803). If EC_LOOKUP returns a failure, then the execution of X is denied (Step 805). Alternatively, where the X_CRED is found, EF passes X_CRED to the KS for checking whether the X_CRED is authentic (Step 806). If X CRED is not authentic, the execution of X is again denied (Step 808). Where X_CRED is authenticated by the KS, the Event Verifier (EV) checks whether the Event Credential allows EV X (Step 809).

In order to check whether the Event Credential (X_CRED) allows the event (EV_X), the following may be implemented: Let the state descriptor in X_CRED consist of the array SD_PCR[ ] of PCR values and the array SD_CMP[ ] of comparison operations; create a temporary array TMP_PCR[ ]:=PCR[ ] as a copy of current SH; let TMP_PCR[i]:=SHA1 (PCR[i] μ event); for index :=0 to n−1: if SD_CMP [index]=='equals' and SD_PCR[index] !=TMP_PCR[index] then, Execution of X is denied. To clarify, because the EC_LOOKUP operation is performed outside the Secure Environment, the EV function must also check that the Event Credential authorizes the event in addition to being authentic. This means checking that the system would result in the desired state from executing the event. The above loop does that and is essentially a copy of the functionality inside the EC_LOOKUPO primitive. Assuming that X_CRED is authentic and allows EV_X, control is passed to the Event Recorder (ER), which records EV_X in the System History (Step 811). Finally, ER passes control back to EF (Step 812), and the EF loads and executes code module X (Step 813). EF returns to step 801 when the next event requires authorization.

KS Bindings and Event Authenticator

The following provides several alternatives for implementing the KS binding and the Event Authenticator discussed above, in accordance with various exemplary embodiments of the present invention KS Bindings As stated above, a KS binding of exemplary embodiments of the present invention is assumed to bind an Event Credential Store (EC) credential to a single instance of a Secure Environment and Key Store. This is in contrast to the Authenticator in an Event Authorization, which is assumed to bind the Event Authorization to a privileged third party who is allowed to manage the secure boot function.

One alternative for providing KS Binding is to use a Keyed-Hashing Message Authentication Code (HMAC) based on SHA1 to create and verify the KS Binding. In this exemplary embodiment, let (1) an Event Credential EC=<state descriptor, ks binding>; and (2) the state descriptor in EC consist of the array SD_PCR[ ] of PCR values and the array SD_CMP[ ] of comparison operations. Create a bit-string consisting of SD_PCR[ ] and SD_CMP[ ]. Call this sequencing a marshaling MARSHAL(EC). Let HMAC_SHA1(key, string) consist of the HMAC_SHA1( ) computed using key key over bit-string string. Let there be a secret key ROOT_EC_KEY that is a 160-bit secret. This key should be kept secret. KS binding for EC can now be defined HMAC_SHA1(ROOT_EC_KEY, MARSHAL(EC)). Authenticity of an EC can be verified by computing TMP :=HMAC_SHA1 (ROOT_EC_KEY, MARSHAL(EC)) and then comparing TMP and the KS Binding in the EC. If they are equal, the EC is authentic.

An alternative KS Binding is a Digital Signature-based KS Binding. In this exemplary embodiment, let (1) Sign{SecretKey}(x) be a public-key based digital signature operation over x for any secure digital signature scheme; (2) Verify{PublicKey}(x, signature) be the corresponding verification operation; and (3) MARSHAL(EC) be defined as in the previous section. KS Binding can now be defined as Sign{Secretkey}(MARSHAL(ec)). The verification would be Verify{PublicKey}(MARSHAL(ec), ks binding).

In this method, there does not need to be stored a secret key inside the Secure Environment, but public key operations are more complex and expensive. Digital Signatures also tend to be longer in bit-length than HMAC_SHA1 message authentication codes.

Event Authenticator

The Authenticator in an Event Authorization is assumed to bind the Event Authorization to a privileged third party who is allowed to manage the secure boot function. This is opposed to the KS Binding that is assumed to bind an EC credential to a single instance of a secure environment and Key Store. This decoupling at the architectural level is intentional, as it allows plugging in arbitrary third party management frameworks independent of their addressing and key-distribution mechanisms.

This section describes an example of how an arbitrary third party mechanism can be implemented using this framework and TCG TPM-based sealing in accordance with one exemplary embodiment of the present invention.

In one exemplary embodiment, the TCG TPM allows sealing access to data to a certain state of the platform, where the platform is defined with a mechanism similar to the state descriptor in the described Event Credential. Sealing may be performed by having the TPM encrypt the data and then binding the encrypted data to a state descriptor. The data can only be unsealed (decrypted) if the PCR[ ] array matches the state descriptor bound to the encrypted data.

There is a multitude of ways to actually implement the management/configuration functionality. Some may require the event authorizer to be inside the secure environment (effectively combining the event manager and event authorizer), while some may not. Mostly this means what level of tamper-resistance is required for the handling of keys in the keystore.

The method in this section describes an exemplary case where both the Event Manager and Event Authorizer are executed outside the context of the Secure Environment, but TCG TPM-provided sealing is used to ensure that the keys are not compromised. This section uses the term Event Authorizer to describe both the Event Manager and Event Authorizer. In this case, the Secure Environment contains the Sealing and Key management functionality described in [TPM1][TPM2][TPM3].

For each secure boot management system X, assume the following exists on the platform: (1) an agent AGENT_X that can verify incoming event authorization and state whether they are a) addressed to this system the Agent is executing on and b) whether the event authorization is valid; and (2) an Event Credential EV_AGENT_X for the execution of this agent with a defined configuration. Further assume there is a store (Event Authorization Store) where pending Event Authorizations can be placed until the corresponding Event Credentials are created, and that HMAC_SHA1-based KS Bindings are used, although other systems would work in a similar fashion.

According to one exemplary embodiment, upon bootstrap, the RTE must check whether the Event Authorization Store is empty or not. If it is empty, then the boot of the EF proceeds as described. If the Event Authorization Store is not empty, the RTE executes the Event Authorizer Function in place of the EF. The RTE of course does require a valid Event Credential for the execution of the event authorization function.

The secret key that is required to create valid KS Bindings for Event Credentials (ROOT_EC_KEY in this case) has been SEALED (using TPM_Seal) to the set of PCR values that exist after the Event Authorizer function has been measured and executed by the RTE and all the management agents (EV_AGENT_X) have been loaded by the Event Authorizer. As such, it will not be decrypted by a TPM if the system is in any other state. Call this sealed object SEALED_EC_KEY.

In one exemplary embodiment, the Event Authorizer function (EA) operates as follows. First, for each EV_AGENT present on the platform, the EA executes and loads these agents. There must exist a valid Event Credential for the loading of the agents and their configuration, and each load is measured. In this sense the EA acts very much like an EF. The PCR[ ] array in the secure environment should now be in the state to which the ROOT_EC_KEY was sealed. The EA now unseals the ROOT_EC_KEY using TPM_Unseal on SEALED_EC_KEY.

For each Event Authorization E_AUTH, the following occurs: (1) the EA looks up the EV_AGENT_X needed to process E_AUTH; (2) EV_AGENT_X validates the E_AUTH; (3) if EV_AGENT_X returns that E_AUTH is authentic and valid then EA creates an Event Credential from E_AUTH by replacing the Authenticator field with a KS Binding created using ROOT_EC_KEY. The EA then wipes the ROOT_EC_KEY from memory, and the system is restarted and the RTE executed.

The system allows any key distribution and addressing method to be used in the EA agents. Event credentials and sealing can be used to protect any verification keys used by the EV_AGENT_X's.

Conclusion:

As described above, exemplary embodiments of the present invention provide a secure boot mechanism that is minimal, robust, flexible, scalable and simple. The framework is minimal (and, therefore, cost efficient) because only one secret is required (i.e., for the KS Binding). In addition, the definition of the secure boot states can be kept in insecure storage (e.g., a hard drive or flash memory), and the secret can be a key for a symmetric cipher; thus causing it to be faster than a public-key-based scheme. In order to reduce cost and minimize the framework even further, in one exemplary embodiment, the Event Authorization and Event Management functions can be left unimplemented. The only consequence being that it makes it impossible to update the Event Credentials.

Because the Event Credentials Store (EC) is located outside the Secure Environment, the EC can be backed up using regular back-up mechanisms, eliminating the need for any additional back-up mechanisms. For at least this reason, the secure boot framework of exemplary embodiments of the present invention is robust. In addition, according to exemplary embodiments described above, the management and run-time behavior of the secure boot framework is decoupled. As a result, management can be done in a secure manner using any addressing and key-distribution framework, independent of the nature of the secure environment. This results in the framework being more flexible than existing frameworks. Advantageously, the secure boot framework of exemplary embodiments is also scalable, since it can be scaled up to handle an arbitrary amount of allowed configurations to boot into. Finally, the framework of exemplary embodiments is simple, in that the features required inside the secure environment are of low complexity.

The fine-granularity of the boot-process also allows one to encrypt individual Event Credentials with a key K. This would prevent their use until the key K is distributed to the device. This could be implemented to restrict the amount of people able to boot into certain configurations. Additionally, because the system allows Event Credentials to be instantiated on the device itself, this allows software to be later built that would allow the user to control the secure boot configuration. A user could, for example, try to configure a system such that it would not boot fully unless an Anti-Virus agent was present. Finally, the proposed solution allows one to bind individual Event Credentials to a single platform, without making the system history specific to a single platform. This means that Remote Attestation (such as that done by TPM_QUOTE operation defined in [TPM3]) can still be done without compromising anonymity or privacy.

As described above and as will be appreciated by one skilled in the art, embodiments of the present invention may be configured as a system, method, mobile device or other apparatus. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
    initiating boot up of a system using a secure boot framework, wherein the system comprises a computational engine and a secure environment operating within the computational engine and isolated from one or more programs, functions, and resources operating outside the secure environment;
    executing a secure enforcement function located outside the secure environment, said secure enforcement function configured to ensure that only authorized program modules are executed on the system;
    creating an event associated with execution of at least one program module to be loaded, wherein the event comprises a code corresponding with the execution of the program module;
    determining whether the event is authorized by locating an event credential associated with the event, said event credential comprising an indication of the event and of a system state in which the event is authorized, and determining whether the event credential is authentic; and
    executing the program module using the secure enforcement function, if the event is authorized.

2. The method of claim 1, wherein executing the secure enforcement function comprises:
    creating an event associated with execution of the secure enforcement function, said event comprising a code corresponding with the execution;
    determining whether the event credential is authentic; and
    passing control over to the secure enforcement function if the event credential is located and authentic, and the event is authorized.

3. The method of claim 2, wherein locating an event credential comprises accessing an event credential store located outside the secure environment, said event credential store comprising a plurality of event credentials.

4. The method of claim 2, wherein the event credential further comprises a key store binding configured to bind the event credential to the secure environment and to a key store located within the secure environment.

5. The method of claim 4, wherein determining whether the event credential is authentic comprises accessing the key store and determining the integrity and authenticity of the event credential based at least in part on the key store binding.

6. The method of claim 2 further comprising:
    determining a current state of the system, wherein determining whether the event is authorized comprises determining whether the event is authorized based at least in part on the current state of the system.

7. The method of claim 1, wherein executing a secure enforcement function comprises a root-of-trust for enforcement program module executing the secure enforcement function, said root-of-trust for enforcement program module operating inside the secure environment.

8. The method of claim 1, wherein locating an event credential comprises accessing an event credential store located outside the secure environment, said event credential store comprising a plurality of event credentials.

9. The method of claim 1, wherein the event credential further comprises a key store binding configured to bind the event credential to the secure environment and to a key store located within the secure environment.

10. The method of claim 9, wherein determining whether the event credential is authentic comprises accessing the key store and determining the integrity and authenticity of the event credential based at least in part on the key store binding.

11. The method of claim 1 further comprising:
    determining a current state of the system, wherein determining whether the event is authorized comprises determining whether the event is authorized based at least in part on the current state of the system.

12. An apparatus comprising:
    at least one processor; and
    at least one memory including computer program code, the at least one memory and the computer program code configured to, with the at least one processor, cause the apparatus to perform at least the following:
        initiate boot up of the apparatus using a secure boot framework, wherein the apparatus comprises a computational engine and a secure environment operating within the computational engine and isolated from one or more programs, functions, and resources operating outside the secure environment;

execute a secure enforcement function located outside the secure environment, said secure enforcement function configured to ensure that only authorized program modules are executed on the apparatus;

create an event associated with execution of at least one program module to be loaded, wherein the event comprises a code corresponding with the execution of the program module;

determine whether the event is authorized by locating an event credential associated with the event, said event credential comprising an indication of the event and of a system state in which the event is authorized, and determining whether the event credential is authentic; and execute the program module using the secure enforcement function, if the event is authorized.

13. The apparatus of claim 12, wherein in order to execute the secure enforcement function the at least one memory and the computer program code are further configured to, with the at least one processor, cause the apparatus to:
create an event associated with execution of the secure enforcement function, said event comprising a code corresponding with the execution;
determine whether the event credential is authentic; and
pass control over to the secure enforcement function if the event credential is located and authentic, and the event is authorized.

14. The apparatus of claim 13, wherein in order to locate an event credential, the at least one memory and the computer program code are further configured to, with the at least one processor, cause the apparatus to:
access an event credential store located outside the secure environment, said event credential store comprising a plurality of event credentials.

15. The apparatus of claim 13, wherein the event credential further comprises a key store binding configured to bind the event credential to the secure environment and to a key store located within the secure environment.

16. The apparatus of claim 15, wherein in order to determine whether the event credential is authentic, the at least one memory and the computer program code are further configured to, with the at least one processor, cause the apparatus to:
access the key store and determine the integrity and authenticity of the event credential based at least in part on the key store binding.

17. The apparatus of claim 13, wherein the at least one memory and the computer program code are further configured to, with the at least one processor, cause the apparatus to:
determine a current state of the apparatus, wherein determining whether the event is authorized comprises determining whether the event is authorized based at least in part on the current state of the apparatus.

18. The apparatus of claim 12, wherein in order to execute the secure enforcement function, the apparatus further comprises a root-of-trust for enforcement program module configured to execute the secure enforcement function, said root-of-trust for enforcement program module operating inside the secure environment.

19. The apparatus of claim 12, wherein in order to locate an event credential, the at least one memory and the computer program code are further configured to, with the at least one processor, cause the apparatus to:
access an event credential store located outside the secure environment, said event credential store comprising a plurality of event credentials.

20. The apparatus of claim 12, wherein the event credential further comprises a key store binding configured to bind the event credential to the secure environment and to a key store located within the secure environment.

21. The apparatus of claim 20, wherein in order to determine whether the event credential is authentic, the at least one memory and the computer program code are further configured to, with the at least one processor, cause the apparatus to:
access the key store and determine the integrity and authenticity of the event credential based at least in part on the key store binding.

22. The apparatus of claim 12, wherein the at least one memory and the computer program code are further configured to, with the at least one processor, cause the apparatus to determine a current state of the apparatus, and wherein in order to determine whether the event is authorized, the at least one memory and the computer program code are further configured to, with the at least one processor, cause an apparatus to determine whether the event is authorized based at least in part on the current state of the apparatus.

23. A system comprising:
an electronic device comprising a computational engine and a secure environment operating within the computational engine and isolated from one or more programs, functions, and resources operating outside the secure environment; and
a secure enforcement function comprising software that when executed is configured to create an event associated with execution of at least one program module to be loaded; determine whether the event is authorized for execution on the system; and to execute the program module if the event is authorized, said secure enforcement function operating outside of the secure environment of the system, wherein in order to determine whether the event is authorized, the secure enforcement function is further configured to locate an event credential associated with the event in the plurality of event credentials of an event credential store and determine whether the event credential is authentic.

24. The system of claim 23, further comprising:
the event credential store operating outside the secure environment and comprising a plurality of event credentials.

25. The system of claim 24, said system further comprising:
a key store located inside the secure environment and accessible by the secure enforcement function, wherein respective event credentials of the event credential store comprise an indication of the corresponding event, an indication of a system state in which the event is authorized, and a key store binding configured to bind the event credential to the secure environment and, in particular, to the key store, such that determining whether the event credential is authentic comprises accessing the key store and determining the integrity and authenticity of the event credential based at least in part on the key store binding.

26. The system of claim 25 further comprising:
a state history database operating inside the secure environment and accessible by the secure enforcement function, said state history database comprising an indication of a current system state as well as of one or more previous system states, wherein the secure enforcement function is further configured to access the state history database in order to determine the current system state.

27. The system of claim 26 further comprising:
an event verifier operating inside the secure environment and accessible by the secure enforcement function, said event verifier configured to determine whether the event is authorized based at least in part on the corresponding event credential and the current system state.

28. The system of claim 27 further comprising:
an event recorder operating inside the secure environment and accessible by the secure enforcement function, said event recorder configured to record the execution of the program module in the state history database.

29. The system of claim 23 further comprising:
a root-of-trust enforcement program module operating inside the secure environment, said root-of-trust enforcement program module configured to execute the secure enforcement function.

30. A computer program product, wherein the computer program product comprises at least one non-transitory computer-readable storage medium having computer-readable program code portions stored therein, the computer-readable program code portions comprising:
a first executable portion for initiating boot up of a system using a secure boot framework, wherein the system comprises a computational engine and a secure environment operating within the computational engine and isolated from one or more programs, functions, and resources operating outside the secure environment;
a second executable portion for executing a secure enforcement function located outside the secure environment, said secure enforcement function configured to ensure that only authorized program modules are executed on the system;
a third executable portion for creating an event associated with execution of at least one program module to be loaded, wherein the event comprises a code corresponding with the execution of the program module;
a fourth executable portion for determining whether the event is authorized by locating an event credential associated with the event, said event credential comprising an indication of the event and of a system state in which the event is authorized, and determining whether the event credential is authentic; and
a fifth executable portion for executing the program module using the secure enforcement function, if the event is authorized.

31. The computer program product of claim 30, wherein the first executable portion further comprises:
a sixth executable portion for creating an event associated with execution of the secure enforcement function, said event comprising a code corresponding with the execution;
a seventh executable portion for determining whether the event credential is authentic; and
an eighth executable portion for passing control over to the secure enforcement function if the event credential is located and authentic, and the event is authorized.

32. The computer program product of claim 31, wherein the fourth executable portion is configured to access an event credential store located outside the secure environment in order to locate the event credential, said event credential store comprising a plurality of event credentials.

33. The computer program product of claim 31, wherein the event credential further comprises a key store binding configured to bind the event credential to the secure environment and to a key store located within the secure environment.

34. The computer program product of claim 33, wherein the seventh executable portion is further configured to access the key store and determine the integrity and authenticity of the event credential based at least in part on the key store binding.

35. The computer program product of claim 31, wherein the computer-readable program code portions further comprise:
a ninth executable portion for determining a current state of the system, and wherein the fourth executable portion is further configured to determine whether the event is authorized based at least in part on the current state of the system.

36. The computer program product of claim 30, wherein the second executable portion comprises a root-of-trust for enforcement program module configured to execute the secure enforcement function, said root-of-trust for enforcement program module operating inside the secure environment.

37. The computer program product of claim 30, wherein the fourth executable portion is configured to access an event credential store located outside the secure environment in order to locate the event credential, said event credential store comprising a plurality of event credentials.

38. The computer program product of claim 30, wherein the event credential further comprises a key store binding configured to bind the event credential to the secure environment and to a key store located within the secure environment.

39. The computer program product of claim 38, wherein the sixth executable portion is further configured to access the key store and to determine the integrity and authenticity of the event credential based at least in part on the key store binding.

40. The computer program product of claim 30, wherein the computer-readable program code portions further comprise:
a seventh executable portion for determining a current state of the system, and wherein the fourth executable portion is further configured to determine whether the event is authorized based at least in part on the current state of the system.

41. An apparatus comprising:
means for initiating boot up of the apparatus using a secure boot framework, wherein the apparatus comprises a computational engine and a secure environment operating within the computational engine and isolated from one or more programs, functions, and resources operating outside the secure environment;
means for executing a secure enforcement function located outside the secure environment, said secure enforcement function configured to ensure that only authorized program modules are executed on the system;
means for creating an event associated with execution of at least one program module to be loaded, wherein the event comprises a code corresponding with the execution of the program module;
means for determining whether the event is authorized by locating an event credential associated with the event, said event credential comprising an indication of the event and of a system state in which the event is authorized, and determining whether the event credential is authentic; and
means for executing the program module using the secure enforcement function, if the event is authorized.

* * * * *